(Model.)  2 Sheets—Sheet 1.

H. CLAYTON.
STOVE PIPE SHELF.

No. 256,290.  Patented Apr. 11, 1882.

Witnesses:
W. W. Mortimer
W. H. Kern

Inventor:
Herbert Clayton
per
F. A. Lehmann,
Atty (Model.)
2 Sheets—Sheet 2.
H. CLAYTON.
STOVE PIPE SHELF.
No. 256,290.  Patented Apr. 11, 1882.
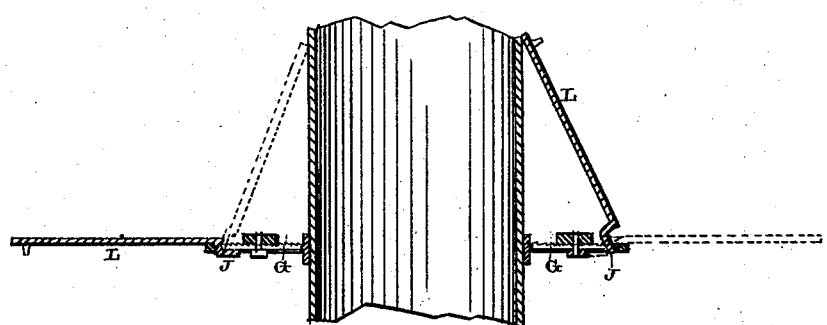
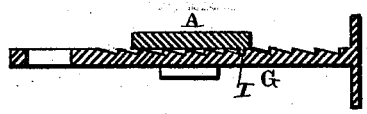
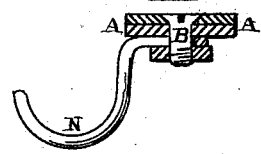
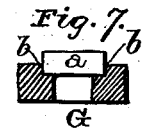
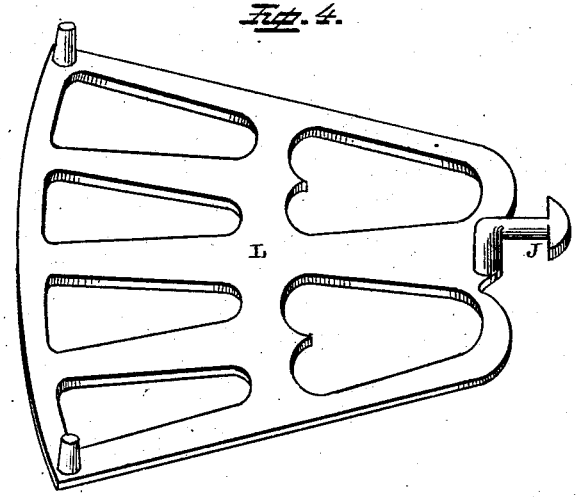
Witnesses.
W. W. Mortimer.
Wm. H. Kerr.
Inventor.
Herbert Clayton,
per
F. A. Lehmann,
Atty
N. PETERS, Photo-Lithographer, Washington, D. C.

UNITED STATES PATENT OFFICE.

HERBERT CLAYTON, OF CINCINNATI, OHIO.

STOVE-PIPE SHELF.

SPECIFICATION forming part of Letters Patent No. 256,290, dated April 11, 1882.

Application filed August 10, 1881. (Model.)

*To all whom it may concern:*

Be it known that I, HERBERT CLAYTON, of Cincinnati, in the county of Hamilton and State of Ohio, have invented certain new and useful Improvements in Stove-Pipe Shelves; and I do hereby declare the following to be a full, clear, and exact description of the invention, such as will enable others skilled in the art to which it pertains to make and use it, reference being had to the accompanying drawings, which form part of this specification.

My invention relates to an improvement in stove-pipe shelves; and it consists, first, in the combination of a collar which is secured to the stove-pipe by means of adjustable clamps, and which collar has openings made through it so that the leaves can be attached directly to the collar without the intervention of the clamps; second, in providing the supporting-leaves with headed projections upon their inner ends, so as to pass through the adjustable clamps, and with a pin or projection upon each of their outer corners, which pins or projections, in connection with the headed projections upon their inner ends, form legs, so that each leaf can be removed from the collar and used either as an ironing-stand or to support hot dishes upon the table; third, in providing the collar with a hook which is formed of wire and held in place by means of the pivotal bolt which secures the two sections of the collar together, and which hook forms a support for a dish-cloth or any other article that it may be desired to hang up.

The object of my invention is to provide a light cheap shelf for stove-pipes, which is adjustable to all sizes of pipes, and in which the leaves can be turned up out of the way when no longer needed for use.

Figure 1:
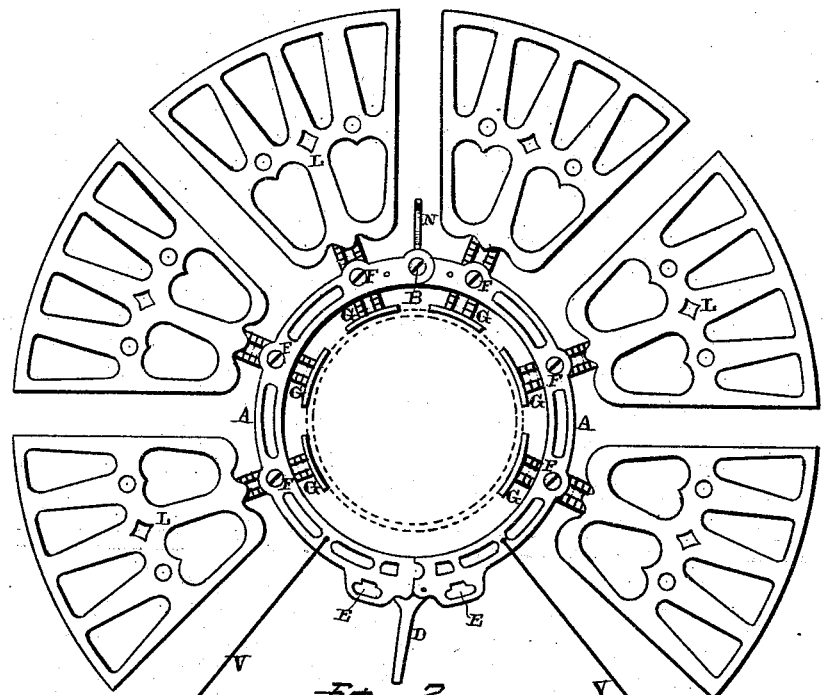
Figure 2:
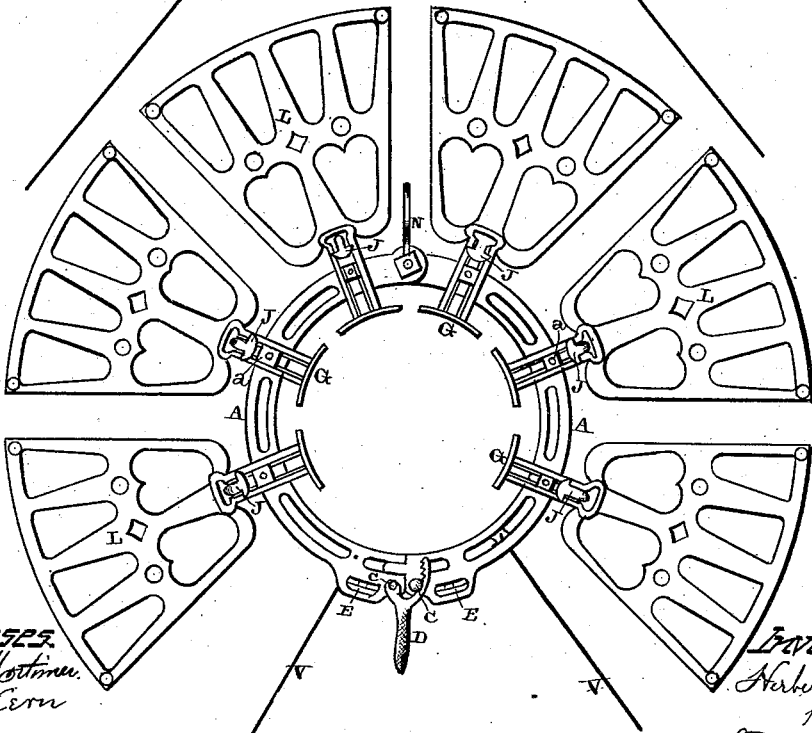

Figure 1 is a plan view of my invention. Fig. 2 is an inverted view of the same. Fig. 3 is a vertical cross-section, showing how the leaves can be turned up against the pipe when no longer needed. Fig. 4 is a perspective of one of the leaves, taken from its under side, showing the projections which form legs for its support when used upon a stove or table. Figs. 5, 6 are detail views. Fig. 7 is a vertical cross-section of one of the clamps, showing the nut in position, the two parts being shown in an inverted position.

A A represent two sections of the collar which is to go around the stove-pipe, which are pivoted together by means of the screw-bolt B. Upon the under side of each one of these sections is formed a headed stud or projection, C, over which the hooked lever D is made to catch, as shown in Fig. 2, for the purpose of locking the free ends of the sections together. Each one of these sections has a recess made in its under side, and the other section has a corresponding projection to fit in this recess, so as to prevent all lateral movement. Through each one of the sections, near the ends where they are fastened together by the lever, are made the oblong openings E, through which the headed projections on the inner ends of the supporting-leaves can be passed for the purpose of attaching the leaves directly to the collar without the intervention of the adjustable clamp which is used in attaching each one of the other leaves to the collar.

To each section of the collar there are bolted a number of adjustable clamps, G, which are slotted very near their entire length, so that they can be moved back and forth upon the screw-bolt F, which secures them in place, and thus have their inner ends bear against the stove-pipe with sufficient force to hold the collar in place upon the pipe. In order to hold each one of these clamps in position, there is a small flange or flanges, I, formed on the under side of each section of the collar, and these flanges catch in the notches or ratchets which are formed upon the upper side of the clamp for the purpose of preventing the clamps from moving outward after they have once been adjusted in position so as to bear against the side of the pipe. The pivotal bolt or screw which holds each clamp in position passes down through the section of the collar, through the slot that is made in each clamp, and through a nut, *a*, which is placed in a groove, *b*, that is made in the under side of the clamp. This nut is placed in a groove in the clamp for the purpose of preventing the nut from turning around, so that when the screw-driver or other tool is applied to the head of the clamping bolt or screw the nut will be prevented from turning around, and thus the mere turning of the screw or bolt will serve to loosen or tighten the clamp in position. Were the nut left free to turn it would be necessary to apply force to it for the purpose of preventing it from turning around whenever an effort is made to loosen or tighten the screw or bolt.

Through the outer end of each one of the clamps is made a slot for the purpose of allowing the headed projection J upon the inner end of each of the leaves L to pass through. These headed projections are of the shape shown, which, after being passed vertically down through one of the slots, allows the leaf to be turned down into a horizontal position, and by catching against the under side of the clamp forms a support for the leaf. When any one or more of the leaves are not wanted for use immediately they can be raised into a vertical position and turned back against the stove-pipe, so as to be out of the way. For the purpose of supporting the leaves more perfectly in position when raised upward, as shown in Fig. 3, there is a slight notch made upon each side of the center of each one of the leaves, and these notches serve to catch in the ratchets or projections on the upper side of the clamp, and thus help to hold each leaf in an upturned position.

In addition to the headed projection formed upon the inner end of each one of the leaves, there is a stud or projection formed upon each one of the upper corners of each leaf, and these studs, in connection with the headed projection, form legs for supporting the leaf above the top of the stove or table, and thus enable each leaf to be used by itself upon the top of the stove or table for the purpose of supporting hot dishes or an iron while ironing.

In order to provide the collar with a means for hanging up the stove-lid lifter or any other similar object, the wire hook N is formed, having an eye upon its upper end, and through this eye is passed the bolt B, which unites the two sections of the collar together. This hook, it will be seen, hangs down below the level of the leaves, so that articles of different kinds hung upon it will not in any manner be in the way of the leaves. Also made through the ends of the sections, near where they are clamped together by the lever D, are small holes, in which are fastened the wires or rods V, upon which towels and other such things can be hung to dry.

Having thus described my invention, I claim—

1. In a stove-pipe shelf, the combination of a collar formed in two parts and fastened together substantially as shown, and provided with openings E for the attachment of the leaves directly to the collar, with adjustable clamps which hold the collar in position upon the stove-pipe and form supports for other leaves, substantially as described.

2. The combination of the two sections of the collar A, fastened together at one of their ends by means of the screw or bolt B, with a hook which has an eye formed upon its upper end, and which is secured to the collar by means of the bolt B, substantially as set forth.

3. The combination of the two sections A, the clamps G, having the grooves $b$ made in their under sides, the nuts $a$, and the clamping-bolts F, the sections A being provided with the flanges I to catch in the notches in the tops of the clamps, substantially as set forth.

In testimony whereof I affix my signature in presence of two witnesses.

HERBERT CLAYTON.

Witnesses:
V. R. ALLEN,
F. WILLIAMS.